Oct. 26, 1948.　　　　F. O. EATON　　　　2,452,111
SPEED RESPONSIVE CLUTCH
Filed Dec. 20, 1946
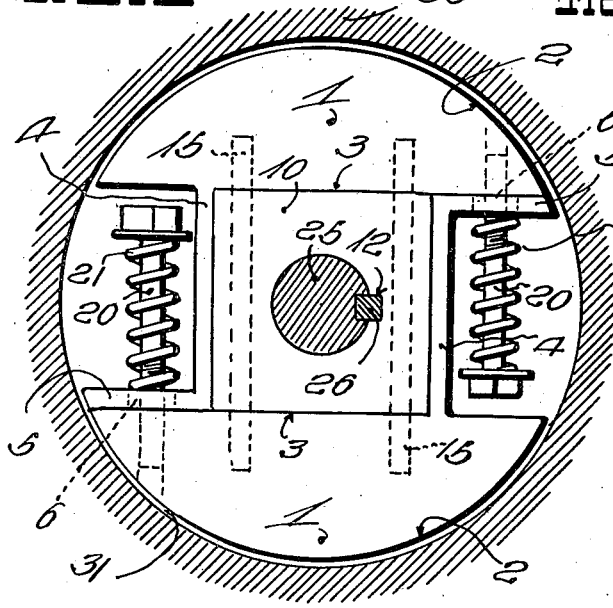
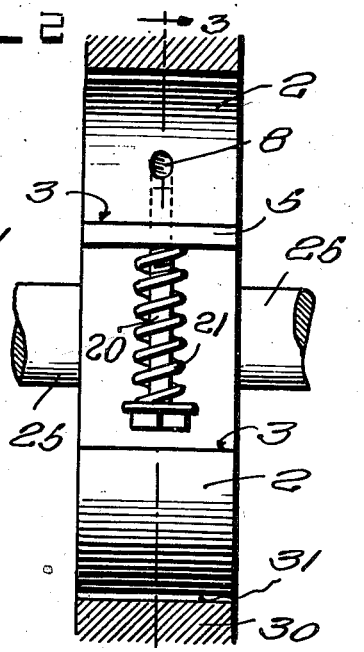
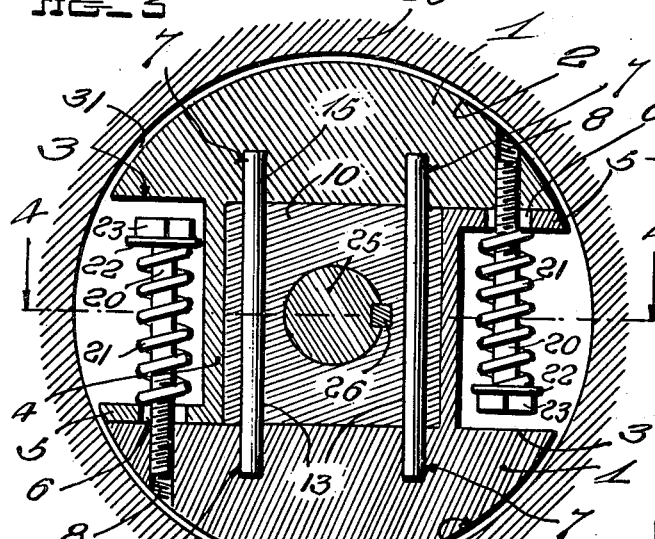
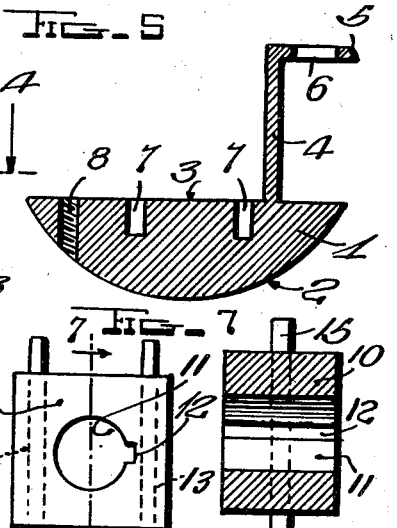
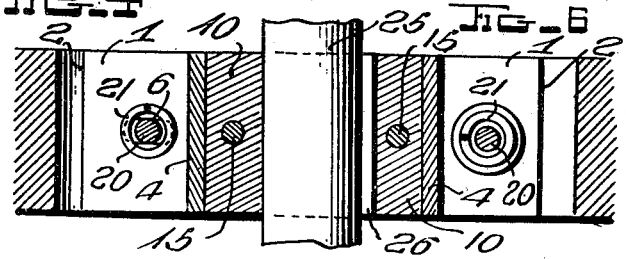
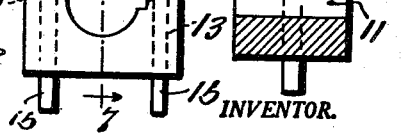
INVENTOR.
FRANK O. EATON,
BY
Frank C. Maley
AGENT Patented Oct. 26, 1948

2,452,111

UNITED STATES PATENT OFFICE 2,452,111

SPEED RESPONSIVE CLUTCH

Frank O. Eaton, Capon Bridge, W. Va.

Application December 20, 1946, Serial No. 717,374

5 Claims. (Cl. 192—105)

The present invention relates to speed responsive friction clutches and more particularly to clutches operated by centrifugal force, on members thereof for frictionally engaging brake members or members to be driven thereby.

It is the principal object of the present invention to provide a centrifugal friction clutch that may be used for transmitting rotary motion from a drive shaft to a driven member or to a brake member as desired and which clutch operates automatically at any desired speed of rotation of the drive shaft.

A further and important object of the invention is to provide a friction clutch for use in governors or for frictionally connecting rotary members and which clutch can be economically provided and maintained due to its relatively few operating members and its mode of assembly.

Other objects of the invention will be in part obvious and in part pointed out in the following detailed description of the accompanying drawings wherein:

Fig. 1 is an end elevation of the clutch forming the present invention.

Fig. 2 is a side elevation of Fig. 1 with the outer collar or driven member shown in cross-section.

Fig. 3 is an end cross-sectional view of the clutch taken on line 3—3 of Fig. 2.

Fig. 4 is a top cross-sectional view taken on line 4—4 of Fig. 3.

Fig. 5 is an end cross-sectional detail view of one of the gripping members forming a part of the present clutch.

Fig. 6 is an end elevation of the drive block also a part of the present clutch.

Fig. 7 is a side cross-sectional view of the drive block taken on line 7—7 of Fig. 6.

Referring now more particularly to the accompanying drawings wherein like and corresponding parts are designated by similar reference characters, numeral 1 indicates each of a pair of similar gripping members formed by a block having an arcuate side 2 and a flat chordal side 3. Said flat side 3 has an inverted L-shaped arm 4 extending perpendicular from an end portion thereof. Said arm 4 has its base 5 extending at right angles therefrom with an opening 6 formed through said base.

The opposite end portion of said flat side 3 has a threaded opening 8 extending therefrom through member 1 to said arcuate side 3. Between said arm 4 and said opening 8, a pair of cylindrical recesses 7 are formed in said side 3.

A drive block 10 of a square configuration is best shown in Figs. 6 and 7. This block 10 has a central bore 11 extending therethrough from front to back with a keyway 12 formed longitudinally in the side of said bore 11. On opposite sides of said bore 11 and extending perpendicular thereto is a pair of openings 13 formed through said block 10 from the top to the bottom thereof.

In each of said openings 13 is positioned a guide rod 15 of a sufficient length to extend from the diametrically opposite faces of said block 10 and with each extending end portion being slidably received in one of said recesses 7 of a gripping member 1.

In the assembly of the clutch a drive shaft 25 with key 26 is positioned through bore 11 and keyway 12 of said block 10. Said gripping members 1 are each placed with their flat side 3 on opposite faces of said block 10 whereby guide rods 15 are slidably mounted in recesses 7. Arms 4 thereby extend along opposite sides of said block 10 with their base 5 contacting the flat side 3 of the opposite gripping member 1.

As shown in Figs. 1 and 2 arms 4 are each of the same length as one of the sides of said block 10 while their bases 5 are sized to extend to the end of said side 3 against which they abut. Further said arms 4 are positioned on their respective sides 3 in order that block 10 will slidably fit between both arms 4 where said gripping members are diametrically opposite to one another.

For retaining said gripping members 1 about said block 10 a pair of bolts 20 are each screwed through opening 6 of each base 5 into threaded openings 8 adjacent thereto.

A coil spring 21 mounted about each of said bolts 20 has one end abutting against the face of the base 5 through which the bolt passes and its opposite end against a washer 22 retained on said bolt 20 by the bolt head 23. The tension of each coil spring is adjusted by screwing its respective bolt 20 into or out of the mating opening 8.

Enclosing said aforementioned members of the clutch is a fixed or rotary collar 30. Said collar 30 may be any of a number of members having a cylindrical bore 31 whose circumference is substantially identical and properly related to the circumference of said arcuate sides 2 of each gripping member 1. Said collar 30 may be a fixed member of a governor for example or may be a pulley or other member to be driven by shaft 25 through the clutch.

In operation, the gripping members 1 are held against block 10 by said springs 21 and normally have a clearance of 1/16" to 1/8" between said arcuate sides 2 and said bore 31. Upon the rotation of shaft 25 by any suitable means block 10 is caused to rotate therewith due to the connection of key 26 and keyway 12. Gripping members 1 are similarly rotated by guide rods 15 and as the speed of shaft 25 is increased members 1 will tend to move outwardly from block 10 on said rods 15 due to the increasing centrifugal force set up thereby. As the centrifugal force becomes sufficient to overcome springs 21 gripping members 1 will gradually have their arcuate sides 3 moved into contact with said bore 31 and as the frictional engagement between said sides 3 and bore 31 increases, either collar 30 will start to rotate, if rotatable, or if fixed, will decrease the speed of members 1, block 10 and shaft 25.

Upon the rotation of shaft 25 being decreased, springs 21 will gradually overcome the centrifugal force of members 1 returning the same against block 10 and out of engagement with collar 30.

The width of collar 30, members 1 and block 10 are determined by the forces involved, namely the power applied to shaft 25 and the speed of rotation of the shaft. As will be seen, the blocks or elements 1 have a very extended arcuate face 2, Figs. 1 and 3, for instance, showing an arcuate length materially exceeding 90°—with a corresponding chordal length of side 3; as a result, the element, when actively engaging the annular face of member 30, provides a comparatively large active gripping area.

The element 1 and the parts carried thereby, approach a balanced condition, in that the arm 4 on one side tends to counterbalance the bolt 20 on the other side, so that the weight factor approaches symmetry, a definite advantage during the centrifugal force activity, since there is less likelihood of any tendency of canting the element relative to its axis, so that the movement of the element relative to its operating pins 15 will be free and uncramped. This is aided by the fact that arm 4 rides in contact with the adjacent face of block 10 tending to assure this freedom of movement, each element thus having three spaced-apart and parallel elements acting to control the direction of outward movement of the element—pins 15 and arm 4.

In addition, while the bolt 20 is individual to the element, the spring 21 carried thereby provides a resistance factor for both elements, the spring contact with washer 22 placing that end of the spring as co-operative with the element which carries the bolt, while the opposite spring end cooperates with the projected portion 5 of arm 4 of the opposite element; hence, the resistance to the centrifugal force action is applied equally on the two elements at each side of the assembly, thus tending to retain this freedom of movement of the elements outwardly in a definite path, doing this without actually directly connecting the two elements, the springs providing an indirect and yieldable connection between them.

As a result, the completed assembly, when inactive, not only encloses the contour sides of block 10, but fills the major portion of the interior of the space provided by the annular face of member 30, as clearly indicated in Fig. 3. And, as is obvious, the assembly is made up of easily fashioned elements which can be readily assembled, so that the structure is not only of great efficiency characteristic, but is of comparatively low-cost type.

While the present clutch is adapted for any purpose for which a speed responsive clutch is required, it is particularly adaptable for chain saw machines of the type generally illustrated by the Mall Patent Nos. 2,184,461 and 2,409,775. The present clutch which occupies substantially the same position as the clutches illustrated in these patents, that is on the engine shaft 85 of Patent No. 2,409,775, or engine shaft 256 of Patent No. 2,184,461, and of course performs the same function as the clutches of these patents.

It is apparent that the device is capable of considerable modification but such changes thereto as come within the scope of my appended claims, I deem to be part of my invention.

I claim:

1. In speed responsive mechanism for clutching activities and the like, wherein an annular face is positioned relative to a rotatable driving member of square contour to present a common axis condition therebetween, a mechanism assembly for operatively producing a frictional clutching relation between the member and face by centrifugal force activity during rotation of the member, said assembly comprising a pair of elements carried by the member and operatively connected therewith to be driven thereby, said elements being of similar contours and dimensions and each including an arcuate face adapted to be cooperative with the annular face and a chordal face normally contacting a side face of the member, said elements being located in similar positions relative to opposite side faces of the member contour, said member carrying a pair of parallel pins in spaced-apart relation, each pin having projecting end zones extending into the elements and forming a drive relation between the member and elements with the elements movable in the direction of length of the projecting pin end zones, each element having an arm projecting normal to the chordal face and in parallelism with an adjacent side face of the member, each arm having its free end provided with a perforated base member extending outward normal to the direction of length of the arm and normally lying in contact with the chordal face of the opposite element, and means including a spring carried individually by each element and coacting with the base member of the other element for producing a yieldable resistance condition opposing centrifugal force with the resistance applied in directions normal to the direction of length of an element chordal face, whereby the element movements relative to the member will be controlled in direction by said pins and by the arm contact with member side faces.

2. An assembly as in claim 1 characterized in that the location of the resistance means carried by one element is on a side of the member opposite that of the resistance means carried by the other element.

3. An assembly as in claim 1 characterized in that the resistance means of an element includes a headed member extending normal to the direction of length of the chordal face of the member and adjustable relative thereto, said member extending through the perforation of the base member of the other element.

4. An assembly as in claim 3 characterized in that the spring of the means is positioned on said headed member between the member head and the base member of the other member through which the headed member passes, whereby the movement of the element responsive to centrifugal force activity is active to develop resistance to element advance through spring compression with the resistance effective equally on both elements.

5. An assembly as in claim 4 characterized in that the element headed member is positioned on the element chordal face remote from a radius of the element which bisects the length of the chordal face and which radius extends through the axis of the assembly, and on the opposite side of such radius from the location of the element arm.

FRANK O. EATON.

REFERENCES CITED

The following references are of record in the file of this patent:

UNITED STATES PATENTS

| Number | Name | Date |
|---|---|---|
| 521,160 | Geiger | June 12, 1894 |

FOREIGN PATENTS

| Number | Country | Date |
|---|---|---|
| 8,294 | Great Britain | Apr. 20, 1896 |
| 17,293 | Great Britain | July 25, 1912 |
| 559,200 | France | Sept. 11, 1923 |
| 637,343 | France | Apr. 27, 1928 |